Patented Aug. 25, 1936

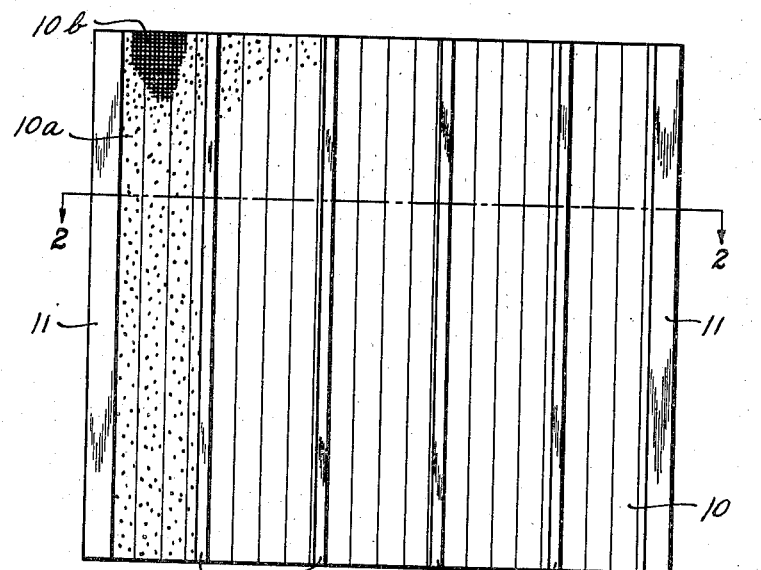
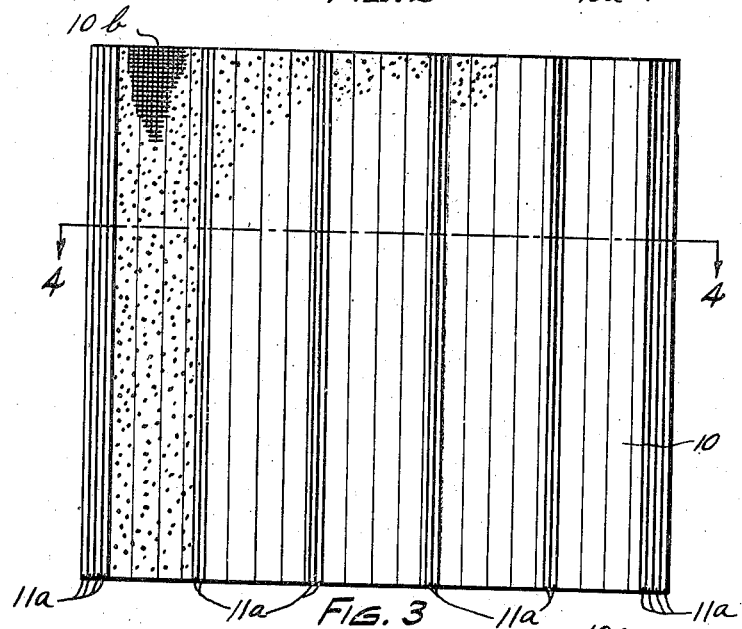

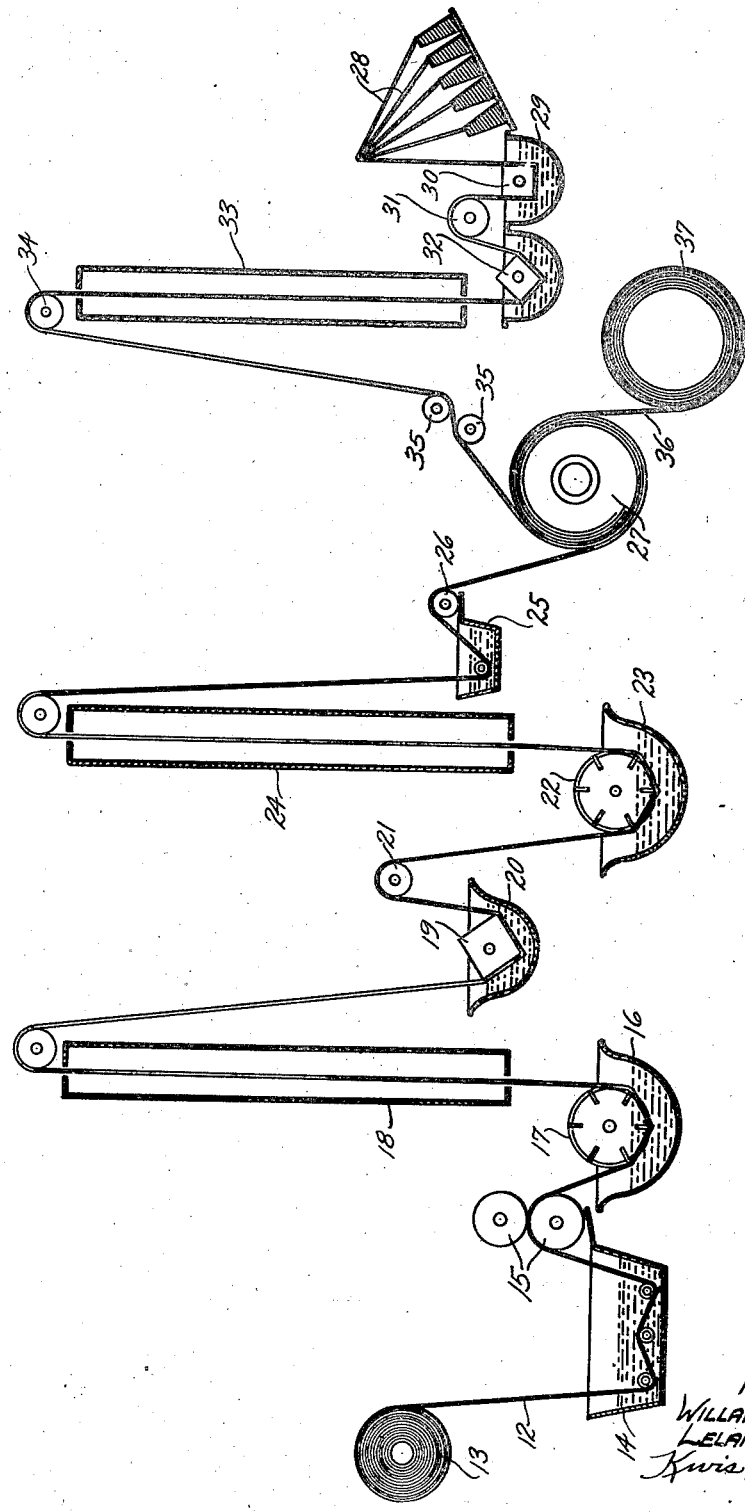

2,052,490

UNITED STATES PATENT OFFICE 2,052,490

METHOD OF MAKING MICROPOROUS ARTICLES

Willard L. Reinhardt, Shaker Heights, and Leland E. Wells, Cleveland Heights, Ohio, assignors to Willard Storage Battery Company, Cleveland, Ohio, a corporation of West Virginia Application November 20, 1933, Serial No. 698,860

14 Claims. (Cl. 91—68)

This invention relates to a method of producing microporous articles and especially microporous diaphragms made principally for use as storage battery separators.

The principal object of the present invention is to provide a diaphragm especially adapted for storage battery insulators or separators which has the desirable qualities and which is practically free from the undesirable characteristics of the best separators in use at the present time.

More particularly, it is the object of this invention to provide a separator or diaphragm which has long life, can be produced inexpensively, has desired stiffness or rigidity, has low resistance, and has a high degree of porosity, but with the pores of microscopic size so as to be readily permeable to liquids, such as the electrolyte of a storage battery, but not to solid particles of any appreciable size.

A further object is to provide an improved method of producing diaphragms having the desired characteristics mentioned above.

The invention may be here briefly summarized as consisting in an improved diaphragm having the structural characteristics hereinafter described, and to the steps of the improved method which will be described in the specification and set forth in the appended claims.

In the accompanying sheets of drawings wherein we have illustrated an embodiment of the invention which is highly successful, Fig. 1 is a face view of a storage battery separator formed in accordance with our invention, with portions broken away to show the interior sheet of fabric;

Fig. 2 is a transverse sectional view of the same;

Fig. 3 is a face view of a separator modified as to the form of the ribs, a portion only of the separator being shown;

Fig. 4 is a transverse sectional view of the same; and

Fig. 5 is a diagrammatic view illustrating one way in which the improved diaphragms may be made.

Generally speaking, our improved diaphragm consists of a sheet or layer of porous material filled and coated with a suitable inert microporous material, such as microporous rubber, the coating and filling material being only of sufficient thickness with respect to the sheet of porous material, which is preferably cotton fabric, to give the latter the required stiffness and rigidity, and, of course, to provide the microscopic character to the porosity of the diaphragm as a whole.

Different kinds of porous material may be employed as, for example, cotton fabric or unwoven fibrous material, such as paper stock, but preferably a thin sheet of woven cotton fabric with a fairly open weave is employed.

The microporous filling and coating material is preferably rubber, made either from natural latex or artificial latex, preferably the former, in the manner or in approximately the manner disclosed in U. S. Patent No. 1,745,657, granted February 4, 1930, to Hermann Beckmann. In following this procedure, latex compounded with sulphur and possibly other ingredients, such as accelerators, is jelled with a suitable jelling solution, such as magnesium sulphate, in a manner such that the water and serums, consisting of carbohydrates, gums, etc., are retained in the reticular structure of the jelly. After the jelly is applied to the porous material, which, for convenience, will be referred to as fabric, it is vulcanized to hard rubber without permitting the escape of the retained water and incidentally the serums, the retention of the water in the jelly during vulcanization, as explained in the Beckmann patent, being important to secure the microporous character of the rubber during and after vulcanization.

It is important to the attainment of the desired results, in making our improved composite diaphragm, that a method be employed of such a nature that a controllable amount of latex compound be caused to jell on the two surfaces and in the interstices of the fabric, and it is desirable also that a method be employed such that the diaphragms are produced by a continuous process, at least up to the point of vulcanization.

These results are obtained by the below described method, which, briefly stated, is:

*First.*—Impregnating the fabric, which can be of any desired predetermined width and either of predetermined or indefinite length, with the jelling solution which is preferably magnesium sulphate of a definite strength, depending upon the nature of the coating required.

*Second.*—The volume of the jelling solution retained in the fabric is regulated to the desired amount, so as to remove the excess solution and leave the interstices open.

*Third.*—The impregnated fabric is then passed through a rubber dispersion, such as a bath of latex compound of known solid content, preferably with the fabric stretched taut, in a manner such that both sides are in contact with the compound.

*Fourth.*—The fabric being filled and coated on both sides, the jelling is permitted to take place, and the process is preferably speeded by passing the jelling sheet through hot water vapor (exhaust steam, for example) so as to set the jell without loss of retained water. In so doing, the jelly is firmly set before it is allowed to touch anything which will disturb its structure, otherwise it will collapse, losing its porosity or separating from the fabric. After the jelly is set, a continuous film of dispersed rubber-water jelly covers the sides and fills the interstices of the fabric, so as to provide a condition which, after vulcanization, forms an interlock between the microporous rubber and the fabric, the open weave fabric being preferably employed for that specific purpose.

Fifth.—Depending upon the desired thickness of the microporous films or layers on the sides of the fabric, the treated sheet may be given a second pass first through a jelling solution and then through the latex compound, the two (or more) pass method also having the advantage of effectively covering any deficiencies in the first coating which may have been caused by bubbles due to air trapped in the meshes of the fabric during impregnation. After the sheet is given two or more passes through the jelling solution and latex compound, it is preferably caused to travel through a chamber containing hot water vapor after each such pass in order to hasten the jelling and cause the jelly to set.

Sixth.—The jelled strip is then vulcanized without permitting the escape of the retained water, thus converting the set jelly into microporous hard rubber. The vulcanization can be carried out in different ways, as will be explained subsequently.

In the drawings, 10 represents a diaphragm in the form of a separator adapted to be placed between the plates in a storage battery of the lead-acid type. The microporous rubber which coats the sides and fills the interstices of the fabric is indicated at 10ª, and the fabric itself at 10ᵇ. This separator is shown as provided with ribs 11 which are preferably vulcanized to the separator body during the vulcanizing operation referred to above. The ribs may be formed of different materials, such as hard rubber or strips cut from the dispersed rubber-impregnated and coated fabric sheet described above, or dispersed rubber-impregnated and coated cords, the latter being illustrated at 11ª in Figs. 3 and 4. The second and third mentioned types of ribs possess considerable advantage over ribs of plain rubber, in that the ribs themselves being of a porous nature do not increase the electrical resistance of the separator to any appreciable extent. Furthermore, due to the fact that these ribs are porous, the separators as a whole do not displace as much electrolyte as would otherwise be the case.

We do not regard it essential that the ribs be formed on the sheet by vulcanizing rib-forming material thereon, as integral ribs may be provided by doubling portions of the sheet upon itself so as to make rib-forming folds. We might say, however, that we do not regard it essential that the separators be provided with ribs of any kind for the equivalent of the same can be secured by giving the sheet a corrugated form during vulcanization. The ribbed type is preferred by us, however, and further reference to the ribbing will be made later.

In Fig. 5 we have shown more or less diagrammatically apparatus which may be utilized in forming our improved separator. As shown in this figure, the fabric, which is designated 12 and which is preferably an open weave cotton fabric of any desired width, is fed from a roll 13 and is passed through a vessel 14 containing a jelling solution, such as magnesium sulphate, which thoroughly impregnates the strip. Next, the impregnated strip is passed between squeeze rolls 15 formed of rubber or other suitable material to remove the excess jelling solution and leave the interstices of the fabric open. Then the wet strip is passed through the latex compound which, in this instance, is in a container 16, the strip passing around a drum 17, the lower part of which is immersed in the solution. This drum, as well as others which may be employed in the process, is preferably provided at its periphery with ribs or bars which the fabric strip engages so that the rubber will thoroughly cover both sides of the strip as well as enter the interstices.

As the strip leaves this bath, the interstices are filled with latex and both sides are thinly coated. As soon as the latex compound is applied to the strip previously impregnated with the jelling solution, the jelling starts to take place, but the process is speeded by passing the jelling strip through a steam chamber 18, the strip here shown entering the lower part of the chamber and leaving the upper part, narrow slots being provided for this purpose in the ends of the chamber so as to prevent the escape of much steam. If a sufficient thickness of rubber is provided on the strip by one pass through the jelling solution and then through the latex compound, the strip, after emerging from the steam chamber, is ready for the application of the rib forming material, if any is applied thereto, and for vulcanization, but generally one or more additional applications of jelling solution and latex compound are preferable, and, in Fig. 5, after the sheet emerges from the top of the steam chamber 18, it is run through a second bath of jelling solution, such as magnesium sulphate, by being passed about the bars on the periphery of a drum 19 which dips down into a vessel 20 containing the solution. Since the strip has already had one impregnation and coating with latex compound, it is unnecessary to again pass the strip through squeeze rolls, and the strip may then be passed around an idler roll 21 and then again around the periphery of a drum 22 which dips into a container 23 which contains latex compound the same as the container 16. Then the strip is again passed upwardly through a steam chamber 24 similar to the chamber 18, which hastens the jelling and sets the jelly without loss of the retained water. The jelled strip is next given a water bath by passing it through a water containing vessel 25.

The strip is now in condition to be vulcanized, and from this point the process can be carried out in different ways. After leaving the vessel 25 and passing over roller 26, the jelled strip may be cut into predetermined lengths and placed between mold plates, one of which may be provided with grooves in which is placed the rib-forming material, such as strips formed from hard rubber composition or strips cut from the jelled sheet treated in the manner just explained, or any other material which can be vulcanized to the strip during the vulcanizing operation. In practice, when a quantity of pairs of mold plates have had placed between them the pieces of the jelled strip and rib-forming material, the mold plates are placed in a vulcanizer and vulcanized in steam (or under water) so that during vulcanization the water will be retained in the reticular structure of the jelly and the latex will be vulcanized to hard rubber and will, after vulcanization, have the microporous condition already explained and more fully described in the Beckmann patent referred to.

Instead of proceeding as above in vulcanizing the jelled strip, Fig. 5 illustrates another method, wherein the preparation of the strip for vulcanization and the positioning of the rib forming material is performed more or less automatically and continuously along with the formation of the jelled strip. As illustrated, after the jelled strip passes over the roller 26, it is wound upon a drum 27. At the same time, jelled rib-forming material is laid on the strip and caused to adhere thereto. In this instance, the rib-forming material consists of a suitable number of cords 28 which may be formed of cotton or hemp or other suitable fibrous material. These are taken from a creel containing a predetermined number of cord cones and are passed through a bath of jelling solution in a container 29, the jelling solution again preferably consisting of magnesium sulphate. These cords are passed about a suitable rotatable drum 30 which dips into the jelling solution so that the cords may become impregnated therewith. Then the impregnated cords are caused to extend about a roller 31 and thereafter are run through a bath of latex compound by being caused to pass about a rotatable drum 32 dipping down into the latex compound so that the cords become coated and to an extent impregnated with the latex compound. The cords are then passed through a steam chamber 33 where the jelling is hastened and the jelly becomes set, and then around a roller 34 above the steam chamber and down between a pair of grooved spacer rollers 35 which arrange the cords into groups of the desired number of cords and with the groups spaced in accordance with the desired spacing of the ribs on the sheet.

Next, the groups of jelled cords are wound onto the drum 27, and, shortly after engaging the drum, they come in contact with the jelled sheet and adhere thereto. At the same time, a fabric liner 36 is caused to be wound on the drum from a roll 37 so as to separate the different convolutions of the jelled strip from each other and keep them from sticking together. If desired, a plied fabric liner with grooves formed therein of a width to accommodate the groups of rib-forming cords may be employed, the grooves of the liner accommodating the groups of cords and assisting in keeping them together in their proper positions in contact with the jelled sheet before and during vulcanization. After a sufficient amount of the jelled strip and the jelled cords has been applied to the drum 27, the feeding of the fabric strip and of the cords is discontinued, and the loaded drum is then conveyed to a vulcanizer, where again the jelled mass is vulcanized to hard rubber without permitting the escape of the retained water. After vulcanization, the sheet or strip coated and impregnated with the microporous hard rubber and with the cords adhering to the strips so as to form the ribs is cut into sections of the size desired for storage battery separators.

We might add that the vulcanization can take place in a chamber in an atmosphere of steam or under water, depending upon the nature of the product desired. If vulcanization occurs under water, the sheet will be more porous than if vulcanized in open steam, but will have somewhat less mechanical strength.

By the unique process described above, of first impregnating the sheet or strip with the jelling solution and then passing the impregnated strip through a latex bath, and repeating the process if desired, as illustrated in Fig. 5, we are able to produce a separator or diaphragm having the precise desired thickness of the microporous hard rubber film or layer on opposite sides of the piece of fabric. We may vary the porosity and electrical resistance not only by varying the number of passes of the strip through the jelling solution and through the latex compound, but also by varying the concentration of the jelling solution and the solid content of the latex solution, and also by varying the speed of passage of the fabric through the baths. The most desirable condition for a separator is, of course, minimum resistance without physical weakness. We have found that with separators made in this manner the physical strength will compare favorably with any separators heretofore made, and the electrical resistance will be practically as low as that of wood separators, but they will have vastly superior life characteristics compared with the wood separators.

To give a specific instance of proportions, we might mention that very good results are obtained with separators of this kind having a thickness of approximately .028 inch, using an open weave cotton fabric having an average thickness of approximately .018 inch. In other words, the fabric thickness exceeds the combined thickness of the two layers on opposite sides of the fabric, which makes it apparent that separators made in accordance with this invention and utilizing an inner sheet of open weave fabric require relatively thin outside layer of this microporous rubber to give the separator the desired strength and stiffness, this being quite a factor in the attainment of the desirable low electrical resistance.

So far as we are aware, these satisfactory results, and especially absolute control of the thickness of the layers which are applied to the fabric sheet, could not be obtained by any other process than the one herein explained, which has for its important characteristics the fact that the sheet is first impregnated with a jelling solution and then passed through the latex solution, the concentration of which may be varied as desired, as can also the speed of passing the fabric through the bath, as well as the number of passes through the jelling solution and through the latex solution. The other details of the process illustrated are not essential and can be varied as desired, especially as to the ribbing or the kind of ribs if any are required. Furthermore, we do not desire to be confined to any particular jelling solution, for, while magnesium sulphate is preferred, we find that other jelling solutions, such as ammonium sulphate, may be used although not so effectively as the salt first mentioned.

A further important advantage of the process above described and illustrated in the drawings is the fact that there is very little direct labor required in the production of these diaphragms or separators, this being an important factor in the low cost of production thereof. It is to be noted that from the beginning of the process to the end there is a constant movement of the fabric, and no direct labor is required until it is necessary to remove the drum 27 when the latter is loaded to the point where conveyance to the vulcanizer is desired. To bring about the uniform and continuous feeding of the strip through the various parts of the apparatus illustrated, it is only necessary to positively drive the squeeze rolls 15, the rolls at the top of the two steam chambers 18 and 24, and the wind-up drum 27, the speed of rotation of these elements being easily correlated to cause the constant movement of the fabric through the apparatus.

Having thus described our invention, we claim:

1. The method of producing a microporous article composed of an inner reenforcing material impregnated and coated with microporous rubber, which comprises treating the reenforcing material sucessively with a jelling solution and a latex compound, whereby a jelled mass is produced, and then vulcanizing the mass without permitting the escape of the water retained in the jelly.

2. The method of producing an article from porous material impregnated and coated with microporous rubber, which consists in causing the openings of the porous material to be filled and the sides to be coated with dispersed rubber jelly having water retained in the reticular structure thereof, by treating the porous material first with a jelling solution and then with a suitable rubber solution, and subsequently vulcanizing the mass in a manner such that the water is retained in the reticular structure of the jelly during vulcanization.

3. The method of making a microporous article which comprises applying to both sides of an open weave fabric a dispersed rubber-water jelly with the two layer interlocked through the openings in the fabric by first impregnating the fabric with a jelling solution, then treating the impregnated fabric with a rubber dispersion, and subsequently vulcanizing the mass without permitting the escape of the water retained in the jelly.

4. The method of making microporous articles which comprises passing a strip of fabric through a jelling solution, then through a rubber dispersion, and, after the jelly is formed and set, vulcanizing the mass without permitting the escape of the retained water in the jelly.

5. The method of forming microporous articles which comprises passing a fabric strip through a jelling solution and then through a dispersed rubber compound so as to fill the pores and apply to the sides a predetermined amount of the rubber compound, and, after the jelling is completed, vulcanizing the mass without permitting the escape of the retained water in the jelly.

6. The method of making microporous articles which comprises causing a fabric strip to be given a predetermined amount of a jelling solution, then applying a predetermined amount of dispersed rubber compound, such as latex, to the interstices and sides of the strip, then subjecting the jelling mass to a medium which hastens the jelling and sets the dispersed rubber-water jelly thus formed, and thereafter vulcanizing the strip while the water of the jelly is retained therein.

7. The method of making microporous articles which comprises passing a strip of cotton fabric through a jelling solution then through a latex solution and then through a medium which hastens the jelling and sets the jelly so that layers of dispersed rubber-water jelly of predetermined thickness are formed on the sides and in the interstices of the strip, and then vulcanizing the mass without permitting the escape of the retained water.

8. The method of making microporous articles which comprises applying to a fabric strip successive layers of a latex-water jelly by passing the strip a plurality of times first through a jelling solution and then through a latex compound, and vulcanizing the mass without permitting the escape of the retained water.

9. The method of forming microporous articles such as described which comprises by a continuous process treating a strip of porous material with a jelling solution and with a dispersed rubber compound so as to form a coating of jelly on the strip, and subsequently vulcanizing the strip or pieces of the same under conditions which convert the jelly to microporous rubber.

10. The method of making articles which comprises by a continous process feeding a strip of fabric or other suitable porous material through a jelling solution and through a dispersed rubber compound, and, after the jelly is formed on the strip and has set, vulcanizing the strip so as to form microporous rubber in and on the sides of the strip.

11. The method which comprises passing a strip of porous material successively through a jelling solution and through a solution of rubber in dispersion, and then providing parallel ribbing on the composite strip.

12. The method of making ribbed storage battery separators which comprises passing a porous strip successively through a jelling solution and a dispersed rubber solution, forming ribbing on the composite strip, and then vulcanizing the same.

13. The method of making ribbed storage battery separators which comprises passing a porous strip successively through a jelling solution and a dispersed rubber solution, forming ribbing on the composite strip, and vulcanizing the same while the water is retained in the reticular structure of the jelly on the strip.

14. The method of making ribbed storage battery separators which comprises passing a porous strip successively through a jelling solution and a dispersed rubber solution, forming ribbing on the composite strip, vulcanizing the same while the water is retained in the reticular structure of the jelly on the strip, and cutting the strip in sections suitable for separators.

WILLARD L. REINHARDT.
LELAND E. WELLS.